United States Patent
Wyble

(10) Patent No.: US 11,593,971 B2
(45) Date of Patent: Feb. 28, 2023

(54) APPARATUS AND METHODS FOR DYNAMIC WHITE POINT COMPENSATION TO IMPROVE PERCEIVED COLOR OF SYNTHETIC CONTENT

(71) Applicant: PCMS Holdings, Inc., Wilmington, DE (US)

(72) Inventor: David Wyble, Webster, NY (US)

(73) Assignee: PCMS Holdings, Inc., Wilmington, DE (US)

( * ) Notice: Subject to any disclaimer, the term of this patent is extended or adjusted under 35 U.S.C. 154(b) by 406 days.

(21) Appl. No.: 16/617,982

(22) PCT Filed: May 16, 2018

(86) PCT No.: PCT/US2018/032948
§ 371 (c)(1),
(2) Date: Nov. 27, 2019

(87) PCT Pub. No.: WO2018/222390
PCT Pub. Date: Dec. 6, 2018

(65) Prior Publication Data
US 2020/0193648 A1    Jun. 18, 2020

Related U.S. Application Data

(60) Provisional application No. 62/513,119, filed on May 31, 2017.

(51) Int. Cl.
*G06T 11/00* (2006.01)
*G06T 7/90* (2017.01)
*G02B 27/01* (2006.01)

(52) U.S. Cl.
CPC .......... *G06T 11/00* (2013.01); *G02B 27/0172* (2013.01); *G06T 7/90* (2017.01); *G02B 2027/014* (2013.01); *G02B 2027/0138* (2013.01)

(58) Field of Classification Search
CPC ........ G06T 11/60; G06T 7/90; G02B 27/0172
See application file for complete search history.

(56) References Cited

U.S. PATENT DOCUMENTS

| | | |
|---|---|---|
| 8,976,191 B1 | 3/2015 | Mendez Mendez |
| 2012/0050307 A1 | 3/2012 | Mahowald et al. |
| 2012/0069051 A1 | 3/2012 | Hagbi et al. |
| 2012/0182276 A1 | 7/2012 | Kee |
| 2012/0320014 A1 | 12/2012 | Longhurst et al. |
| 2014/0063039 A1 | 3/2014 | Drzaic |
| 2015/0070337 A1 | 3/2015 | Bell et al. |

FOREIGN PATENT DOCUMENTS

| | | |
|---|---|---|
| WO | WO 2015138170 A1 | 9/2015 |
| WO | WO 2016/133650 A2 | 8/2016 |

OTHER PUBLICATIONS

Durmus, D., & Davis, W. (2015). Optimising light source spectrum for object reflectance. Optics Express, 23(11), A456-A464.*

(Continued)

*Primary Examiner* — Sarah Lhymn
(74) *Attorney, Agent, or Firm* — Flaster Greenberg, P.C.

(57) ABSTRACT

The invention pertains to methods and apparatus for compensating the rendering of virtual content in an augmented reality scene as a function of the white point, spectral distribution, color or other optical parameter of the real content in the scene.

19 Claims, 4 Drawing Sheets

(56) References Cited

OTHER PUBLICATIONS

Vrhel, M. J., & Trussell, H. J. (1992). Color correction using principal components. Color Research & Application, 17(5), 328-338.*

Hordley, S. D. (2006). Scene illuminant estimation: past, present, and future. Color Research & Application: Endorsed by Inter-Society Color Council, The Colour Group (Great Britain), Canadian Society for Color, Color Science Association of Japan, Dutch Society for the Study of Color, The Swedish Colour Centre Fou.*

Gabbard, J. L., Swan, J. E., Zedlitz, J., & Winchester, W. W. (Mar. 2010). More than meets the eye: An engineering study to empirically examine the blending of real and virtual color spaces. In 2010 IEEE Virtual Reality Conference (VR) (pp. 79-86). IEEE.*

Goma, S., & Aleksic, M. (Feb. 2006). Computational inexpensive two-step auto white balance method. In Digital Photography II (vol. 6069, pp. 123-131). SPIE.*

Hiroto Matsuoka et al., "Environment mapping for objects in the real world: a trial using artoolkit", Augmented Reality Toolkit, The First IEEE International Workshop, pp. 70-71, Jan. 1, 2002, 2 pages.

Tian Jiangdong et al., "Simple and effective calculations about spectral power distributions of outdoor light sources for computer vision", Optics Express, vol. 24, No. 7, pp. 7266-7286, Mar. 28, 2016, 21 pages.

Wonwoo Lee et al., "Real-time Color Correction for Marker-based Augmented Reality Applications", GIST U-VR Lab, Gwangju, S. Korea, 2009, 4 pages.

Mark D. Fairchild, "Color Appearance Models", Second Edition, Munsell Color Science Laboratory, Rochester Institute of Technology, John Wiley & Sons Ltd., 2005, West Sussex, England, 409 pages.

The Institute of Electrical and Electronics Engineers, Inc. (IEEE), "Adaptive Camera-Based Color Mapping For Mixed-Reality Applications", DBLP, Sep. 2017, Basel, Switzerland, 5 pages.

R.W.G. Hunt, "The Effects of Daylight and Tungsten Light-Adaptation on Color Perception", Kodak Limited, Dec. 5, 1949, Harrow, England, 10 pages.

Mark D. Fairchild and Lisa Reniff, "Time course of chromatic adaptation for color-appearance judements", Munsell Color Science Laboratory, J. Opt. Soc. Am. A/vol. 12, No. 5/May 1995, Rochester, New York, 10 pages.

Cie, "A Colour Appearance Model for Colour Management Systems: CIECAM02", Publication 159:2004, Commission Internationale de l'Eclairage, Vienna, Austria, 24 pages.

* cited by examiner

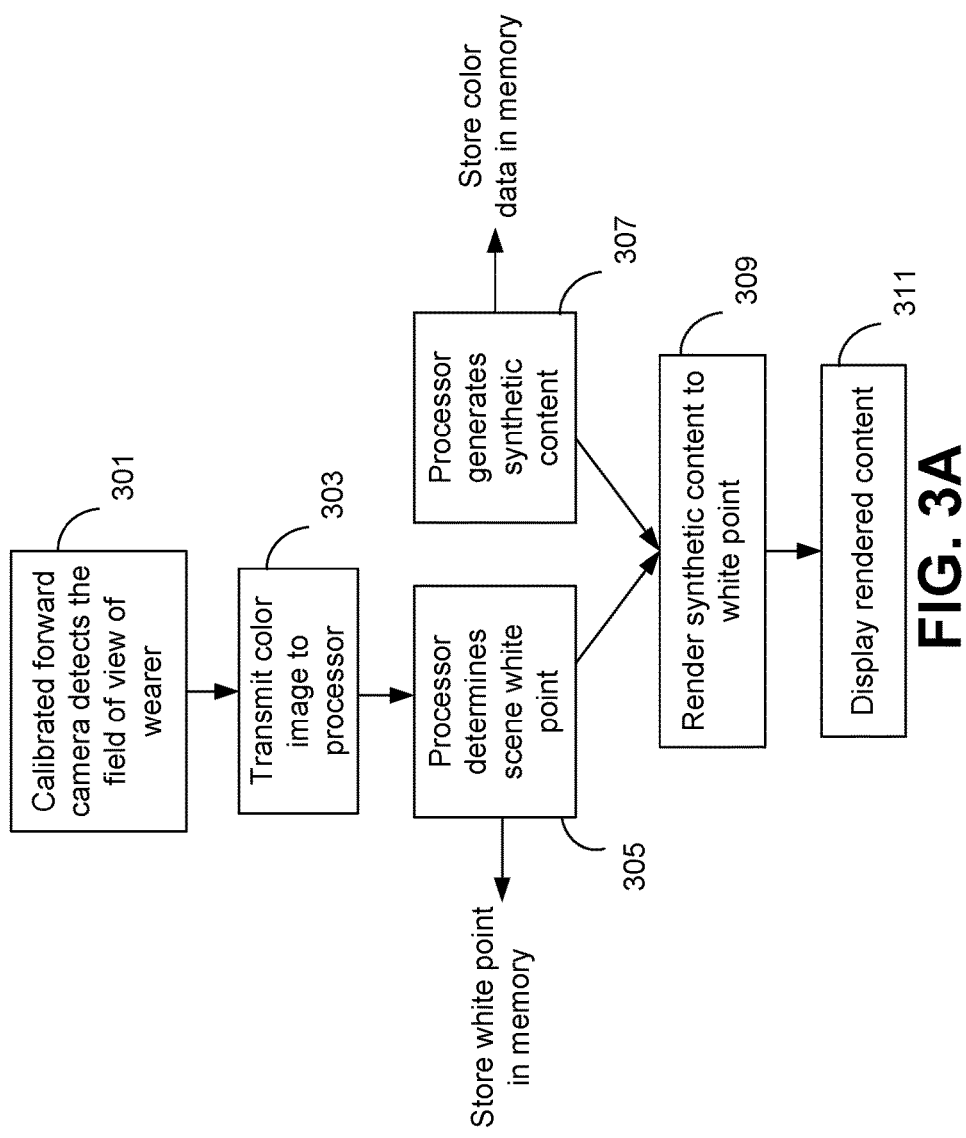

APPARATUS AND METHODS FOR DYNAMIC WHITE POINT COMPENSATION TO IMPROVE PERCEIVED COLOR OF SYNTHETIC CONTENT

This application is a 371 U.S. National Stage entry of PCT Application No. PCT/US2018/032948, filed May 16, 2018, which claims priority from U.S. Provisional Patent Application No. 62/513,119 filed on May 31, 2017, the contents of which are hereby incorporated herein by reference as if fully set forth.

BACKGROUND

Augmented reality headsets present the wearer with a substantially unobstructed view of the real world, and also have the potential to overlay synthetic, computer-generated (i.e., virtual) content into the scene via a head-mounted display. Both the real world and synthetic imagery may be viewed in real time, and the synthetic imagery may be dynamically repositioned to account for the wearer's eye, head, and body motion. A forward facing camera may supply the processor with information about the real world as it appears in the wearer's field of view. Scene markers (i.e., pre-known real visual elements in the scene) may be used as references to accurately determine and adjust the position of any synthetic imagery inserted into the scene.

SUMMARY

Methods and apparatus are disclosed for compensating the rendering of synthetic content in an augmented reality scene as a function of the white point (or other optical property, such as spectral power distribution or color) of the real-world content in the scene. In accordance with one exemplary embodiment, an augmented reality system includes at least a camera for capturing images (e.g., real-world scenes), a display device (e.g., augmented reality goggles), and a processor for generating synthetic content and inserting the synthetic content into the display of the device that displays the real-world content or image. The processor also may receive or otherwise be provided with certain characteristics of the camera and/or characteristics of the optical transmission properties of the display equipment (e.g., the spectral transmissivity of the augmented reality goggles). In an embodiment, the camera captures an image of a real-world scene and sends it to the processor, which, among other tasks, estimates the white point (or other optical property, e.g., spectral power distribution or color) of the light source illuminating the scene based on the known camera characteristics and the image of the scene. It may then determine an appropriate virtual illuminant to be used for rendering the synthetic content based on the estimated white point of the captured image and, optionally, the optical transmission characteristics of the augmented reality goggles, and then render the synthetic content to the augmented reality goggles. In an embodiment, the processor may correlate the determined white point of the scene to a predicted illuminant (e.g., natural daylight or an incandescent lightbulb) and then select the color of the virtual illuminant to closely match the estimated real-world illuminant.

In other embodiments, the camera may be adapted to capture the image of the real-world after having passed through the goggles, in which case the optical transmission properties of the goggles would inherently be factored into the measurement output of the camera, thereby potentially eliminating any need to separately compensate for the optical transmission properties of the goggles.

In a potential enhancement to any of the embodiments, temporal smoothing may also be employed to smooth the transition over time of the rendered synthetic content responsive to changing conditions (e.g., changing lighting) in the real-world scene with which the synthetic content is being combined. This may involve determining the difference between a previous estimated white point of the real-world content of the scene and the current estimate, and dividing the difference into a number of steps and incrementing the target white point by these steps over an interval of time. Such embodiments may be beneficial for systems in which the real-world scene illuminant can change perceptibly more quickly than the virtual illuminant can be updated (e.g., at a periodicity that is significantly quicker than the rate at which the system updates the virtual illuminant).

In another potential enhancement to any of the embodiments, the temporal smoothing may be implemented only if the difference between the two estimates of the white point exceeds a threshold.

DRAWINGS

A more detailed understanding may be had from the Detailed Description below, given by way of example in conjunction with the drawings appended hereto. Figures in such drawings, like the detailed description, are examples. As such, the Figures and the detailed description are not to be considered limiting, and other equally effective examples are possible and likely.

Furthermore, like reference numerals in the Figures indicate like elements, and wherein:

FIG. 2 is a block diagram illustrating the components of an exemplary augmented reality display system;

FIG. 3A is a flow diagram illustrating processing in accordance with a first aspect of an embodiment;

DETAILED DESCRIPTION

Figure 1A:
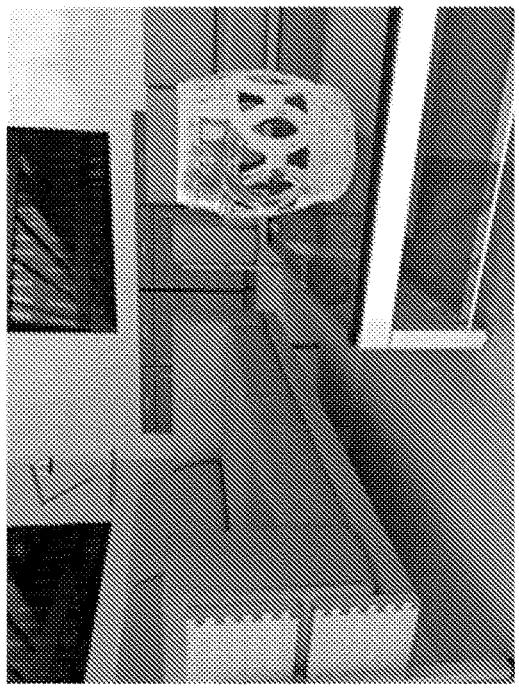
FIG. 1A is a picture illustrating an augmented reality scene comprising real content and synthetic content.

When synthetic content is generated for insertion into a real-world scene to create an augmented reality experience, it should be rendered into a specific color space. Particularly, different lighting conditions may cause the same scene to have different color palettes (or, in more technical terms, spectral power distributions). For instance, a scene that is illuminated by a first type of illuminant (e.g., natural daylight) would have a very different appearance than the exact same scene illuminated by a second type of illuminant (e.g., incandescent light). An illuminant is a lighting source, and different types of lighting sources have different spectral power distributions. Part of the data defining a spectral power distribution for a particular illuminant (and often the most significant) is the white point. The white point is a set of tristimulus values or chromatic coordinates (e.g., RBG)

that defines the color to which the observer is adapted. The white point commonly is the whitest white that exists in a scene. Since the vast majority of most humans' visually perceived surroundings are illuminated by one of a rather small number of standard types of illuminants, it is common to refer to different common spectral power distributions by the name of the corresponding illuminant (e.g., natural daylight, twilight, cloudy light, incandescent light, fluorescent light, LED light). Also, each of these different standard illuminants has a particular white point.

Typically, the rendering process, either implicitly or explicitly, makes assumptions about the state of adaptation of the wearer of the goggles. Optimally, any synthetic content that is displayed by the goggles should be balanced to the same white point as the real-world content within the field of view of the user of the goggles (i.e., the scene) in order to present a natural looking scene to the user. If the white point (and/or other aspects of the spectral power distribution or color) of the rendered synthetic content did not well match the white point (and/or other parameters) of the real-world content of the scene, the synthetic content might appear unnatural or out of place in the scene, thus rendering the user's augmented reality experience less than optimal. Ultimately, the display coordinates (e.g., RGB) for rendering the synthetic content are set and fixed as a function of the particular white point that is selected. This white point could be set manually by the wearer or automatically by detection of the real-world content of the scene (and, preferably, including compensation for any optical properties of the display hardware). In limited and static cases, the manual method could work, but the automatic method is preferred to avoid operator intervention, which might diminish the experience for the user. For some general cases, typical rendering modes can be selected manually.

The white point of a light source may be expressed as a color temperature. Specifically, the color temperature of a light source is the temperature of an ideal black-body radiator that radiates light of a color comparable to that of the light source. Color temperature is conventionally expressed in Kelvins, using the symbol K, a unit of measure of absolute temperature. Examples include: for home indoor scenes use a white point of about 3000K, which is typical for scenes lit by conventional incandescent lighting; for outdoor scenes select a white point of 5500K, which is common for natural daylight; for retail/commercial scenes select a white point typical for fluorescently lit scenes (typically anywhere from 2700K to 5000K depending on the type of fluorescent light).

If the selected white point for virtual content does not match the white point for the type of lighting present in the real-world scene, the accuracy of the rendering is compromised and the synthetic content of the scene may appear unnatural or out of place to the user. Further, if the real-world white point changes, for example, because the wearer moved to a different room with different lighting or the room lighting itself changes, the synthetic content may no longer look natural to the user.

Figure 1B:
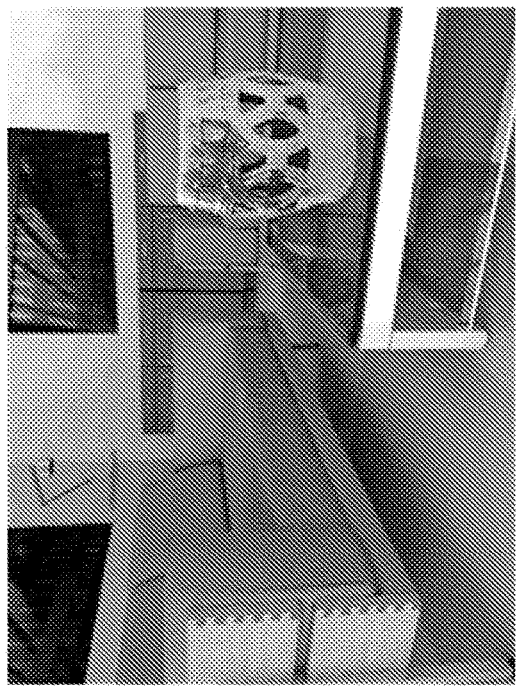
FIG. 1B is a picture illustrating a similar augmented reality scene as FIG. 1A, but with different lighting of the real content of the picture.
Figure 1C:
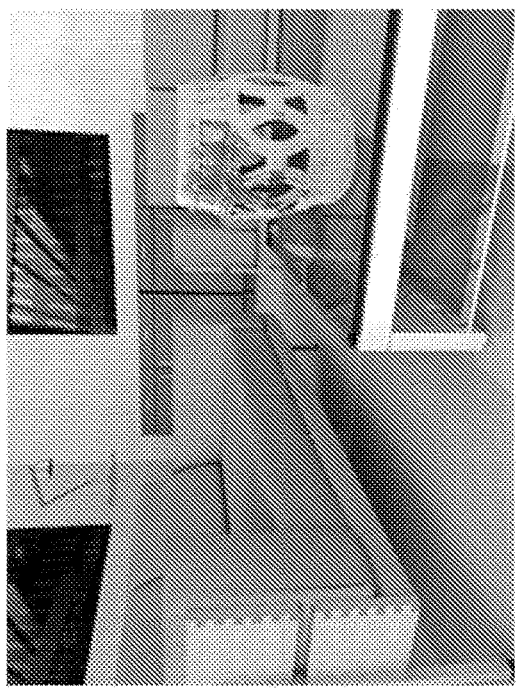
FIG. 1C is a picture illustrating a similar augmented reality scene as FIGS. 1A and 1B, but with corrected lighting of the synthetic content.

FIGS. 1A, 1B, and 1C demonstrate the effect of inserting synthetic content into a real-world scene with matched and mis-matched white points. The object 111 on the table 113 in FIG. 1A represents correctly-balanced synthetic content for typical indoor illumination (e.g., incandescent light). In FIG. 1B, the white point of the real-world content of the scene 115 has been changed to a daylight illumination source (e.g., sunlight, which is somewhat more blue). However, the synthetic object's rendering is unchanged, having been rendered for indoor illumination, as in FIG. 1A, and thus appears somewhat unnatural in the scene, thus likely to detract from the augmented reality experience of the user. This demonstrates the importance of properly rendering the color of the synthetic content to account for the white point of the real-world scene. Failure to do so results in the mismatch seen in FIG. 1B, where the color of the synthetic object 111 appears unnatural in the scene as compared to the rendering in FIG. 1A, in which the virtual illuminant (or color of the virtual illuminant) used to render the synthetic object is closely matched to the real-world illuminant of the real content in the scene. Finally, FIG. 1C shows the same general scene as in FIGS. 1A and 1B, but in which the real-world content is illuminated with a typical daylight lighting source (as in FIG. 1B) and the synthetic object has also been rendered using a correlated virtual white point, i.e., daylight illuminant. In FIG. 1C, the synthetic object 111 on the table probably will appear more natural to the user that in FIG. 1B, in which is it rendered using an inappropriate white point setting that is uncorrelated with the illuminant of the real-world content of the scene.

FIG. 2 is a block diagram illustrating the basic components of an augmented reality display system. It comprises an augmented reality headset 200 comprising goggles 201 to be worn by a user. The headset 200 also includes a calibrated forward facing camera 203 for capturing the scene as viewed by the wearer and feeding it to a processor 205.

In an optical pass-through augmented reality system embodiment such as illustrated in FIG. 2, the camera also passes the captured real-world scene to the goggles 201 for rendering on the goggles as a video image (in combination with any synthetic content that also will be rendered by the goggles). That is, the goggles are generally opaque and the user views a video image of the real-world scene in front of him as picked up by the camera plus any synthetic content added thereto.

On the other hand, in a see-through augmented reality system embodiment, the goggles 201 are substantially transparent and the forward facing camera 203 does not pass through the captured images to the goggles for display (since the user can see the actual real-world scene through the goggles), but rather only to the processor so the processor can use the information in the captured images to determine when, where, or how to display any synthetic content added into the scene via the goggles.

The system also would commonly include a memory 209 and an inertial motion sensing unit 207 that detects motion of the headset and reports it to the processor, which uses the motion data to render the virtual content on the goggles as a function of the position and/or movement of the headset.

The processor 205 may be co-located on the headset 200 with the motion sensing unit 207, camera 203 and goggles 201 or may be located separate from the headset. In some embodiments, the camera 203 or additional cameras (not shown) may be located separately from the headset 200.

The present invention will be described herein mostly in association with an exemplary embodiment of a pass-through augmented reality system. However, it should be understood that this is merely exemplary and is not a requirement or limitation on the invention, and that the techniques, apparatus, and methods disclosed herein also may be used in association with see-through augmented reality systems.

The processor 205 uses data from the camera 203 to estimate both the positional coordinates of the real-world content of the scene (e.g., to allow for accurate positioning of any synthetic content relative to the real-world content) and the white point of the scene (e.g., to allow the processor to estimate the white point of the scene and to render the synthetic content using the optimal color-balance). The white point may be estimated, for instance, in terms of colorimetric coordinates or absolute spectral power distribution.

More particularly, as is well known, both positional and white point estimation may be made directly via scene markers (real-world objects in the scene having a pre-known location and/or color), or indirectly by alternative estimating schemes. For example, a series of known color and neutral patches can be imaged and the absolute spectral power distribution or color spectrum of the source of illumination can be estimated statistically or by table look-up.

When the wearer changes physical position (e.g., by turning his/her head; or walking) or the lighting environment changes (e.g.: an indoor light is turned on or off), the user's perceived white point may change, which may mean that the synthetic content must be re-rendered to correlate to the new white point. After re-rendering, the synthetic content will appear more natural with respect to the real-world objects in the scene. Further, the perceived color of the synthetic content will be more accurate.

During the normal process of displaying synthetic content to the wearer, the synthetic content must be regularly re-rendered to accommodate any movement of the wearer as well as spatial changes in the synthetic content itself (e.g., the synthetic content is not necessarily stationary in the scene). For example, the content may be an animal or car that is intended to appear as though it is in motion. The regular spatial and color re-rendering is to account for any change in 1) the position of the synthetic content with respect to the wearer, and 2) the white point of the new scene. If the scene changes by a large degree, the adjustment of the white point of the synthetic content may be made gradually over time to avoid jitter and unexpected rapid shifts in color perception. This will maintain the natural experience for the wearer.

The process will produce more accurate and representative colors in the synthetic content. When the scene white point changes, the accompanying change in appearance of the synthetic content will follow natural expectations, and the perception of the synthetic content will therefore be more realistic.

The real-world scene may be aligned with scene markers that may be used as references to position synthetic content that will be inserted into the real-world field. Additionally, a known white field may be incorporated into the scene marker. Other fields also may be present to permit even more robust spectral determination of the light source.

The forward facing camera measures the actual color of the field of view of the wearer. In some embodiments, this measurement may be taken from images captured through the goggles so that the optical properties (minimally the transmittance) of the goggles is inherently factored into the measurement. In other embodiments, the optical properties of the goggles may be separately measured in real-time or known a priori and may be applied as an adjustment to the measurement data from the camera. From that color data (and the goggle properties, as the case may be) an estimate of the white point is made. The literature describes many methods to estimate white point. For the purpose of explaining this process any established method can be applied, including spectral estimation and/or table lookup.

For the initial insertion of synthetic content, the color of that content is rendered using the estimated white point, and then the synthetic content is inserted into the visual field by displaying it on the display system. The white point used for rendering the synthetic content may be stored in the memory 209. If the properties of the synthetic content include spectral reflectance, then the spectral data should be rendered to display coordinates (RGB) using a device characterization model (with consideration of the white point).

As noted above, since the lighting and white point of the real-world scene can change over time, the process described above should be repeated continuously. For example, periodically (e.g., once per second), the data from the forward-facing camera may be re-read and the newly measured white point compared to the white point that was used to render the presently displayed synthetic content, and the rendering settings for the synthetic content updated accordingly.

In one embodiment, a minimum threshold is set for changing the rendering settings as a function of white point. For instance, if the change in white point is below a minimum threshold of noticeability ($T_{notice}$), nothing is done. If, on the other hand, the white point has changed by more than $T_{notice}$, then the display parameters are adjusted.

In an embodiment, in order to provide as natural an experience as possible, the change may be effected gradually or incrementally. For instance, in one embodiment, the white point change is divided into a set of increments and the rendering of the synthetic content is adjusted to the first incremental white point level for a defined period, then the rendering is adjusted to the next white point level and displayed as such for another defined period, and so on until the new measured white point level is achieved.

If the real-world white point is restricted (either inherently or by design) to change slowly enough that the process for re-rendering of the synthetic content to a new white point can keep pace with it (e.g., the re-rendering to a new white point is performed frequently enough that any differences in the rate at which the white point of the synthetic content is rendered relative to the rate of change of the real-world white point would not be noticeable to the wearer), then such smoothing may be omitted. Further, in such high frequency embodiments, it may be preferable to not use any threshold ($T_{notice}$) for changing the white point for rendering the synthetic content.

The white point of a scene is merely one exemplary criterion for determining the illumination of a scene. In other embodiments, one may use additional or different optical properties for this purpose, such as the spectral power distribution (absolute or relative) or color, rather than just the white point.

In yet other embodiments, the number of possible virtual white points (or virtual spectral power distributions) available for use for rendering the virtual content might be limited to a finite number of particular absolute spectral power distributions, such as the standard absolute spectral power distributions of a number (e.g., 20) of the most common standard illuminant types. In such embodiments, the processor may be configured to select the one of the 20 available spectral power distributions for rendering the synthetic content that is closest to the estimated spectral power distribution of the scene captured by the camera.

FIG. 3A is a flow chart describing one process by which the rendering white point is applied to the actual color of the synthetic content to create the RGB rendering. This flow chart may be followed only once for each component of the synthetic content.

At 301, a calibrated forward facing camera mounted on the goggles detects the real-world scene that the wearer is viewing. At 303, the camera transmits the image data to the processor. Although not shown in the FIG., in a pass-through type augmented reality system, the camera would also transmit the images to the goggles for display to the wearer. At 305, the processor processes that image data to determine information indicative of the illumination characteristics of the scene, such as a white point, spectral power distribution, absolute spectral power distribution, color, or illuminant type. For purposes of this discussion, we shall assume that it is white point data. The processor stores the white point data for later reference.

In parallel, at 307, the processor is also generating synthetic content to be inserted into the real-world scene and storing the color data for that content in memory.

Next, at 309, the processor adjusts the color data for the synthetic content to correlate with the determined white point of the real-world scene (as determined at 305). For example, if it is determined that the real-world content in the scene is illuminated with incandescent light, then the synthetic content is rendered to the white point correlated with incandescent light. In an embodiment, the rendering also takes into account the known optical properties of the goggles, such as its optical transmissivity, and further adjusts the rendering in accordance with that data. Finally, at 309, the goggles display the rendered synthetic content to the user.

Figure 3B:
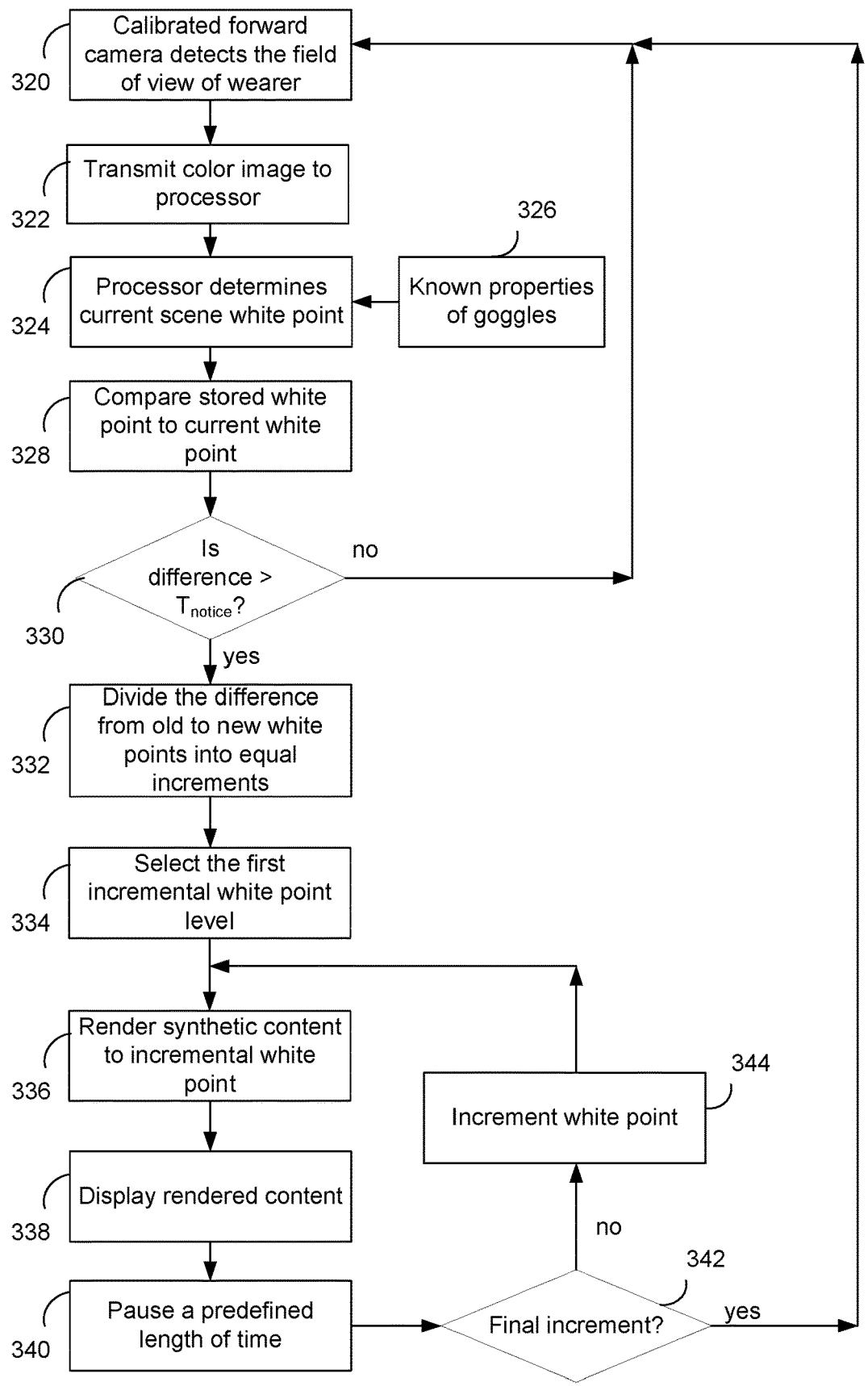
FIG. 3B is a flow diagram illustrating processing in accordance with a second aspect of an embodiment.

Once the synthetic content is inserted, the flow chart of FIG. 3B may then be executed until the synthetic component is removed from the scene. If a component is re-inserted after removal, the process in FIG. 3A should be applied again.

Referring to FIG. 3B, at 320, the camera re-detects the real-world scene that the wearer is viewing. At 322, the camera transmits the image data to the processor. At 324, the processor processes that image data to determine a white point of the scene, including using the known parameters 326 of the goggles, such as optical transmissivity, and saves it in memory.

Up to this point, the processing is similar to that described above for the corresponding steps of the process of FIG. 3A.

Next, at 328, the processor compares the white point determined at 405 to the white point currently being used in the rendering of the synthetic object. At 330, if the difference between those two white points does not exceed a threshold, $T_{notice}$, processing returns to 320 to take another sample of the scene.

If, on the other hand, the difference exceeds the threshold, $T_{notice}$, flow instead proceeds from 330 to 332, in which the difference between the old and new white points is divided into a number of equal increments. In one embodiment, the number of increments may be predetermined (e.g., 5 increments). In other embodiments, the spacing of the increments may be predetermined (e.g., each increment is 100K). The process may round the first, last, or any middle increment from 100K if the total difference between the two white points is not an integer multiple of 100. Alternately, the process may be configured to stop at the closest 100K increment to the target illuminant. In yet other embodiments, the number of increments may be other functions of the magnitude of the difference between the two white points.

Next, at 334, the first incremental white point level is selected and, at 336, the synthetic content is re-rendered based on this white point level. At 338, the rendered content is displayed by the goggles.

At 340, a delay period is allowed to pass. The delay period may be predetermined (e.g., 10 milliseconds). In other embodiments, it may be set as a function of the magnitude of the difference between the two white points. In yet other embodiments, it may be a function of one or more other factors, such as a user-set preference, motion in the scene, past history of change in white point of the real-world scene, etc.

Next, at 342, it is determined if the preceding increment was the last increment step in the series. If so, processing returns to 320. If not, then processing instead flows to 344, in which the white point is incremented to the next incremental value and flow proceeds back to 336 to generate the next rendering and display.

The process of FIG. 3B of re-determining the scene white point and adjusting the rendered content appropriately may be repeated as frequently as deemed necessary for the duration of the viewing of each particular rendered synthetic component, e.g., once every 0.5 seconds.

An example mathematical transforms on which the process of transforming the rendering of synthetic content as a function of the difference between the determined real-world scene white point and the initial, uncorrected white point of the synthetic content to be rendered could be based are shown below. Note that this transform is based on the chromatic adaptation transformation CAT02 described in Color Appearance Models, 2nd Ed. Mark D. Fairchild, Wiley (2005), but this is not meant to be exclusive of any other particular method. The process described in this disclosure will work equally well using any display calibration method and any chromatic adaptation transform.

The input color for each pixel of the synthetic content is specified as an XYZ triplet. As described in the equation below, it is transformed to a cone fundamental space by the matrix $M_{CAT02}$. The resulting RGBs should not be confused with device RGBs. Rather, they are stand-ins for cone responses in the eye. The central diagonal matrix is based on ratios of the current and destination white point coordinates, which have been similarly transformed to the RGB cone space. In the equations, the current white point is the white point associated with the initial representation of the synthetic content, i.e., the previously determined white point. The destination white point is the white point that it is desired to use for the rendering of the synthetic content. The destination white point is based primarily on the determined white point of the real-world scene (as determined from the results of real-world scene white point estimation). However, it should be noted that the desired rendering white point for the synthetic content may not be exactly the determined white point of the real-world scene and may be adjusted therefrom. For example, as previously noted, the white point used for rendering the synthetic content may be adjusted to compensate for properties of the goggles, such as optical transmissivity. Finally, the scaled RGB cone fundamentals are transformed back to XYZ by the inverse of $M_{CAT02}$.

$$\begin{bmatrix} X \\ Y \\ Z \end{bmatrix}_{out} = M_{CAT02}^{-1} \begin{bmatrix} R_{out}/R_{in} & 0 & 0 \\ 0 & G_{out}/G_{in} & 0 \\ 0 & 0 & B_{out}/B_{in} \end{bmatrix} M_{CAT02} \begin{bmatrix} X \\ Y \\ Z \end{bmatrix}_{in}$$

The above transformation is applied to each pixel in the synthetic image. After this image transformation is completed, the $XYZ_{out}$ values must be further transformed into RGB device coordinates. A simple device model is shown below. Like the chromatic adaptation model, there are other options for the device model. Any such model will work equally well for the process described in this disclosure.

The model below transforms the input XYZ by a 3×3 matrix, the inverse of the radiometric measurements of the display.

$$\begin{bmatrix} R \\ G \\ B \end{bmatrix}_{device} = M_{RGB2XYZ}^{-1} \begin{bmatrix} X \\ Y \\ Z \end{bmatrix}$$

If the object properties of the synthetic content include spectral reflectance, the input XYZ coordinates are first calculated by the usual CIE methods:

$$W_i = \Sigma_\lambda S_\lambda R_\lambda \overline{w}_{i,\lambda} \Delta\lambda,$$

where $W_i$ is the $i^{th}$ tristimulus value (X, Y, or Z); $S_\lambda$ is the estimated or measured ambient spectral power distribution; $R_\lambda$ is the spectral reflectance of the object; and $\overline{w}_{i,\lambda}$ is the $i^{th}$ color matching function ($\overline{x}_\lambda$, $\overline{y}_\lambda$, or $\overline{z}_\lambda$). Note that this transform is applied for each pixel in the synthetic content.

The ambient spectral power distribution $S_\lambda$ may be directly measured (e.g., with a spectroradiometer built into the forward-facing optics) or estimated using a series of patches in the marker field. The estimation method could predict any of: correlated color temperature, spectral power distribution, or an index into a table of typical illuminants (e.g.: daylight, incandescent, LED, fluorescent, etc.). Any of these quantities can be directly or indirectly applied to the above equation to calculate the tristimulus values $W_i$.

Figure 4:
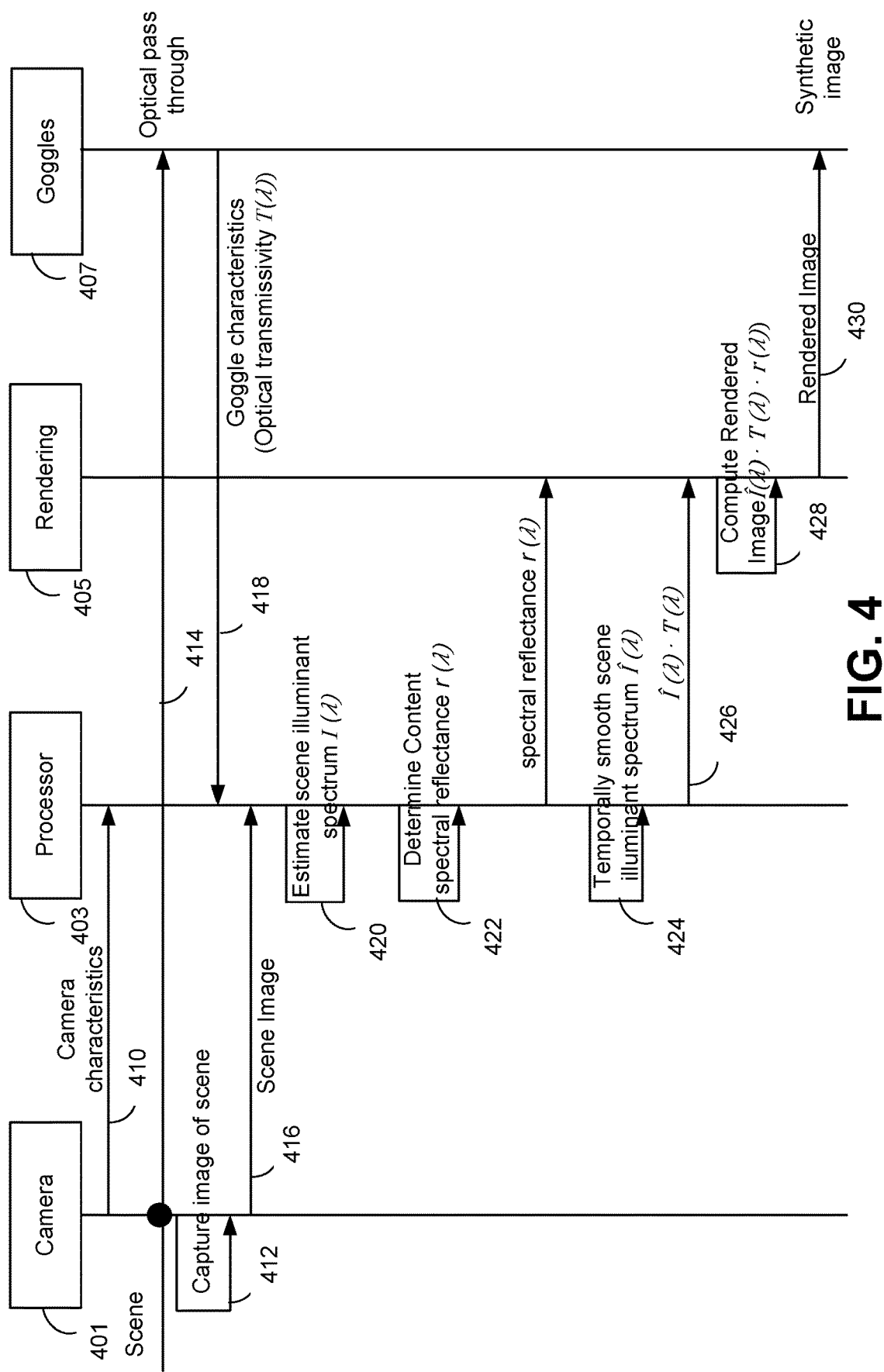
FIG. 4 is a signal flow diagram according to an embodiment.

FIG. 4 is a signal flow diagram illustrating an exemplary signal flow between the camera, the goggles, the rendering module and the processor. It will be understood that the rendering module may reside in the main processor (and, particularly, may be a software module executed in the processor).

In accordance with an embodiment, at 410, the camera 401 reports its optical and other characteristics to the processor 403. For instance, this may be an International Color Consortium (ICC) profile. The processor can use the optical characteristics information in evaluating the images provided to it by the camera for many purposes, including adjusting the determined the white point of the captured images based on the optical characteristics. At 412, the camera captures images of the real-world scene and passes the images to the goggles (signals 414) for display to the user. It also sends the images to the processor (signals 416) for, among other things, use in determining the white point of the scenes captured in the images.

The goggles 407 also may report to the processor any relevant optical characteristics thereof (e.g., another ICC profile), such as its optical transmissivity, T(λ), at 418. The optical transmissivity of the googles may alter the real-world scene as displayed on the goggles as compared to what the camera captured and thus, its effect on the real-world image as well as the synthetic content generated should be accounted for when calculating the white point that is desired for rendering the synthetic content on the goggles.

Next, at 420, the processor estimates the real-world scene illuminant, I(λ) (or other property, such as white point, measured or tabulated spectral power distribution, color, etc.).

If the object properties of the synthetic content include spectral reflectance, then, at 422, the processor 403 also may determine a spectral reflectance for the synthetic content, r(λ). At 424, the processor may report the spectral reflectance to the rendering module 405. It will be understood by those of skill in the related arts that the rendering module may be a software module running on the processor 403. If this is not the initial rendering of the synthetic content (i.e., the synthetic content has already been rendered on the goggles using a previously determined spectral reflectance value) and that temporal smoothing is being applied, then, at 426, any temporal smoothing between the previously used property and the new estimated property, such as that described above in connection with steps 330-344 of the flow chart of FIG. 3B, may be calculated to generate an intermediate scene illuminant, Î(λ).

At 428, the processor 403 reports to the rendering module 405 the scene illuminant for use in rendering the synthetic content (whether it is the intermediate value, Î(λ), calculated using temporal smoothing or the originally calculated value, I(λ), when no temporal smoothing is applied). At this time, the processor may also report the optical transmissivity, T(λ), of the goggles to the rendering module. Then, at 430, the rendering module 405 computes the synthetic content to be rendered applying (1) the determined scene illuminant, I(λ) or Î(λ), (2) the optical transmissivity of the goggles, T(λ), if available and, (3) the determined spectral reflectance, r(λ), if available. At 432, the rendering module 405 renders the synthetic content to the goggles 407 in association with the real-world images received from the camera 401 in step 414.

Additional Alternate Embodiments and Use Cases

The solutions described above consider only the color of the white point, and a temporally-smoothed transition from one white point to another. The literature describes the process by which the human vision system adapts to changes in color and luminance. Smoothing the white point transition using a more perceptually-conscious method would increase the seam lessness and naturalness of the wearer experience. Adaptive Camera-Based Color Mapping for Mixed-Reality Applications, Martin Knecht, Christoph Traxler, Werner Purgathofer, IEEE International Symposium on Mixed and Augmented Reality 2011: Science and Technology Proceedings, 26-29 October, Basel, Switzerland, proposes a temporal smoothing method, but it is described as operating on the tone mapping only using a one-pole filter on each component tone scale function to block flicker caused by image noise. The solution described herein could apply a perceptual smoothing as well. The visual mechanisms and qualities of the perceptual adaptation rate have been described by The Effects of Daylight and Tungsten Light-Adaptation on Color Perception, R. W. G. Hunt, J. Opt Soc Am 40, No. 6 (1950) and Time course of chromatic adaptation for color-appearance judgments, Mark D. Fairchild and Lisa Reniff, J. Opt. Soc. Am. A/Vol. 12, No. 5 (1995).

The absolute luminance also will affect perceived color. Applying this information could further increase the accuracy of the synthetic content rendering and smoothing. A color appearance model, such as proposed by the A Colour Appearance Model for Colour Management Systems: CIE-CAM02, Publication 159:2004. Commission Internationale de l'Eclairage can account for the absolute luminance as well as many other effects, such as the surround and observer state of adaptation.

The invention has countless potential applications. Merely a few examples include architectural visualization, product design and marketing, and remote visualization of anthropological artifacts.

As one example application of viewing retail furniture or other home furnishings, customers will understand that there are several lighting conditions that regularly exist in a home. These customers may know that viewing under these diverse conditions is an important part of their decision-making process when purchasing furniture or other fixtures for a home and may desire to view potential purchases under several of these lighting conditions. The process described herein will allow an accurate, comfortable, and natural experience across all viewing conditions.

For other color critical applications, such as insertion of branded products and logos into real-world scenes, the ability to properly control the color accurately is crucial for the product manufacturers. Anyone wanting to ensure the accurate perception of their brand will need the most accurate rendering for all situations.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed", "computer executed", or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to", "at least," "greater than", "less than", and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

In addition, use of the terms "means for" in any claim is intended to invoke 35 U.S.C. § 112, ¶6 or means-plus-function claim format, and any claim without the terms "means for" is not so intended.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of displaying synthetic content on an augmented reality display device, the method comprising:
    capturing an image of a scene;
    estimating a white point of light illuminating the scene based on the captured image;
    computing a virtual white point value for use in rendering synthetic content on the display device in association with the captured image, the virtual white point value based on the estimated white point;
    determining a spectral reflectance of the synthetic content;
    rendering the synthetic content based on the computed virtual white point value and the determined spectral reflectance of the synthetic content; and
    displaying the rendered synthetic content on the display device in association with the captured image.

2. The method of claim 1 wherein the computed virtual white point value is selected from a finite group of white point values corresponding to real world illuminant sources.

3. The method of claim 1 further comprising:
    obtaining at least one optical characteristic of a camera used to capture the image of the scene;
    wherein the white point is further based on the at least one optical characteristic of the camera.

4. The method of claim 1 wherein the augmented reality display device is augmented reality goggles.

5. The method of claim 4 further comprising:
    receiving an optical property of the augmented reality goggles; and
    wherein the rendering of the synthetic content is further based on the optical property of the augmented reality goggles.

6. The method of claim 5 wherein the optical property of the augmented reality goggles comprises an optical transmissivity of the augmented reality goggles.

7. The method of claim 1 further comprising:
    determining a difference between the white point of the captured image and a white point of a previously captured image that was previously displayed on the display device along with the synthetic content; and
    wherein the rendering comprises transitioning the rendering of the synthetic content between a rendering based on the virtual white point of the previously rendered image and a rendering based on the virtual white point of the captured image in multiple, temporally-spaced increments.

8. The method of claim 7 wherein the transitioning comprises:
    dividing a difference between the virtual white point of the previously rendered image and the virtual white point of the captured image into a plurality of incremental white points; and
    successively rendering the synthetic content based on successive ones of the incremental virtual white points for successive periods of time until the virtual content has been rendered and displayed based on all of the successive incremental virtual white points.

9. The method of claim 1 further comprising:
    determining a difference between the white point of the captured image and white point of a previously captured image that was previously displayed on the display device along with the synthetic content;
    wherein the rendering comprises:
    if the difference exceeds a threshold, transitioning the rendering of the synthetic content between a virtual white point based on the white point of the previously rendered image and a virtual white point based on the white point of the captured image in multiple, temporally spaced increments; and
    if the difference does not exceed the threshold, transitioning the rendering of the synthetic content between the virtual white point based on the white point of the previously rendered image and the virtual white point based on the white point of the captured image in one increment.

10. An apparatus for displaying synthetic content in association with real-world content on a display device, the apparatus comprising:
    a camera configured to capture an image;
    a processor configured to:
        receive the image from the camera;
        estimate a white point of light illuminating a scene based on the image;
        compute a virtual white point for use in rendering synthetic content on the display device in association with the image, the virtual white point based on the estimated white point;
        determine a spectral reflectance of the synthetic content;
        render the synthetic content based on the computed white point and the determined spectral reflectance of the synthetic content; and
        send the rendered synthetic content to the display device for display in association with the image; and
    the display device configured to:
        display the image in association with the synthetic content; and
        display the synthetic content in association with the image.

11. The apparatus of claim 10 wherein the processor is further configured to compute the virtual white point by selection from a finite group of white points corresponding to real-world illuminant sources.

12. The apparatus of claim 10 wherein the processor is further configured to:
   obtain at least one optical characteristic of a camera; and
   further base the estimated white point on the at least one optical characteristic of the camera.

13. The apparatus of claim 10 wherein the display device is goggles and the camera is mounted on the goggles in a forward-facing direction.

14. The apparatus of claim 13 wherein the processor is further configured to receive an optical property of the goggles, and wherein the rendering of the synthetic content is further based on the optical property of the goggles.

15. The apparatus of claim 14 wherein the optical property of the augmented reality goggles is optical transmissivity.

16. The apparatus of claim 10 wherein the processor is further configured to:
   determine a difference between the white point of the image and a white point of a previous image that was previously displayed on the display device along with the synthetic content; and
   wherein the rendering comprises transitioning the rendering of the synthetic content between a rendering based on the virtual white point of the previously rendered image and a rendering based on the virtual white point of the image in multiple, temporally-spaced increments.

17. The apparatus of claim 16 wherein the processor is further configured to affect the transitioning by:
   dividing a difference between the virtual white point of the previously rendered image and the virtual white point of the image into a plurality of incremental white points; and
   successively rendering the synthetic content based on successive ones of the incremental virtual white points for successive periods of time until the synthetic content has been rendered and displayed based on all of the incremental virtual white points.

18. The apparatus of claim 10 wherein the processor is further configured to;
   determine a difference between the white point of the image and a white point of a previous image that was previously displayed on the display device along with the synthetic content;
   determine if the difference between the white point of the image and the white point of the previous image exceeds a threshold;
   if the difference exceeds the threshold, transition the rendering of the synthetic content between a virtual white point based on the white point of the previously rendered image and virtual white point based on the white point of the image in multiple, temporally spaced increments; and
   if the difference does not exceed the threshold, transition the rendering of the synthetic content between the virtual white point based on the white point of the previously rendered image and the virtual white point based on the white point of the image in one increment.

19. A method of displaying synthetic content on an augmented reality display device, the method comprising:
   capturing an image of a scene;
   estimating a color of light illuminating the scene based on the captured image;
   selecting a virtual illumination source for use in rendering synthetic content on the display device in association with the captured image, the virtual illumination source being based on the estimated color;
   determining a spectral reflectance of the synthetic content;
   rendering the synthetic content based on the selected virtual illumination source and the determined spectral reflectance of the synthetic content; and
   displaying the rendered synthetic content on the display device in association with the captured image.

* * * * *